Jan. 9, 1968  J. D. RAMSAY  3,362,334

MATERIAL SENSING SYSTEM

Filed Oct. 18, 1965

INVENTOR:
JOSEPH D. RAMSAY
BY *Howson & Howson*
ATTYS.

United States Patent Office 3,362,334
Patented Jan. 9, 1968

3,362,334
MATERIAL SENSING SYSTEM
Joseph D. Ramsay, Audubon, N.J., assignor to Campbell Soup Company, Camden, N.J., a corporation of New Jersey
Filed Oct. 18, 1965, Ser. No. 497,028
7 Claims. (Cl. 103—25)

ABSTRACT OF THE DISCLOSURE

Electrically conductive material in an electrically-conductive container is detected by using a "power probe" and a "pick-up probe" both insulated from the container, applying AC power between the power probe and the container, and detecting current which flows from the power probe through the material to the pick-up probe and thence to the container by way of an external circuit. The external circuit includes a first rectifier to permit use of a DC-operable magnetic amplifier for sensing the pick-up current. A second forward-biased rectifier balances out the threshold voltage of the first rectifier to enhance sensitivity, and another diode circuit connected to the pick-up probe prevents polarization effects.

---

Figure 1:
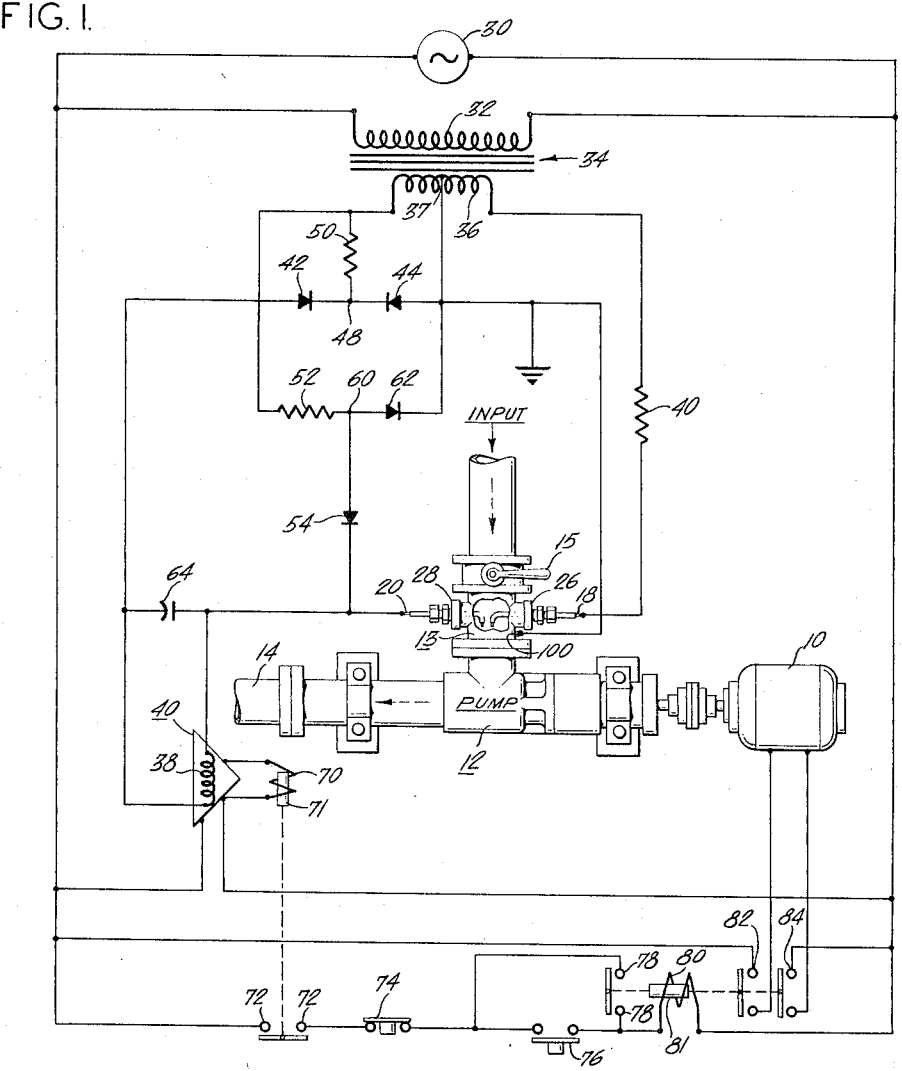

This invention relates to apparatus for sensing changes in the electrical resistance between two regions, and particularly to apparatus for producing electrical indications of the presence or absence of electrically-conductive flowable material in a conduit and for operating equipment in response to such indications.

There are many applications in which it is desirable to detect and provide indications of the electrical resistance between two regions, for example to provide indications of the presence or absence of an electrically-conductive material between said regions. One particular application of such apparatus occurs in connection with systems in which a liquid or semi-liquid material, for example a food product such as soup, is moved through a conduit by the rotor of a motor-driven pump during a production process; in such cases it may be highly desirable to produce electrical indications whenever the food material is absent from a predetermined position in the conduit. For example, the pump used to move the food product may be of a type employing a rotor which is damaged if it is operated when dried out due to the absence of the liquid or semi-liquid food material. In this case an electrical system for detecting absence of the food material at or near the pump is advantageously used to terminate operation of the motor which drives the rotor. In such systems used for such purposes, it is also important that the apparatus utilized be sanitary in the sense that it not introduce any contaminants into the food product, and that it be reliable and capable of long-term operation.

Accordingly it is an object of the invention to provide new and useful apparatus for sensing the electrical resistance between two regions.

Another object is to provide new and useful apparatus for producing electrical indications of the presence or absence of a flowable material, such as a liquid or semi-liquid food product, in a conduit.

Another object is to provide the latter type of apparatus which is suitable for controlling the operation of a pump which causes the motion of the material through the conduit, so as to terminate operation of the pump when the material is absent from the conduit.

Another object is to provide such apparatus in which the arrangement utilized insures sanitary handling of the flowable material, and is highly reliable.

In accordance with the invention these and other objects and features are achieved by apparatus comprising a first and a second conductive probe located within respective spaced regions of a container between which the material to be detected extends when present, the container also being at least in part of conductive material and the probes insulated therefrom. A source of alternating voltage is applied between a first of the two probes and the conductive container and the second probe is connected through a current-sensing device to the conductive container. A first rectifying device is connected in series with the current-sensing device, and the arrangement is such that with no conductive material bridging the gap between the two probes substantially no current flows through the current-sensing device, while the presence of material bridging the gap between the two probes causes a current to flow through the load device, thereby indicating the presence of the material. The current-sensing device may, for example, be the coil of a relay used to operate indicating equipment or, preferably, to turn off a motor driving the pump which normally causes the material to move through the container. More particularly, the arrangement is preferably such that when the conductive material is absent from the region extending between the two probes the resultant decrease in current through the current-sensing device shuts off the motor which drives the pump, thereby assuring that the rotor of the pump will not be operated dry, and hence will not be damaged. The effect of the arrangement described is such that any leakage current flowing over the insulating means between the first probe and the container, which may for example be due to residue of the conductive material, will produce a current which does not flow through the current-sensing device, and hence such leakage current cannot produce spurious operation of the current-sensing device in the absence of material bridging the gap between the probes.

According to a further feature of a preferred form of the invention, the second probe is separately supplied from an alternating-voltage source, by way of a second rectifying device, with a signal occurring in the intervals between the intervals of conduction in the first rectifying device and in opposite phase to the voltage applied to the first probe. This latter, opposite-phase signal prevents polarization effects which otherwise might interfere with most reliable operation.

In the preferred embodiment there is employed a further feature consisting of the arrangement of a third rectifier in series with the above-mentioned first diode and of similar type but poled oppositely in the series electrical circuit, and a fourth rectifier connected in series with the second rectifier between the second probe and the container and of a type similar to the second rectifier but oppositely poled in the series circuit; the interconnection of the first and third rectifiers is supplied with an alternating voltage of the same phase as the above-mentionel depolarizing alternating voltage which is supplied to the third rectifier. The third and fourth rectifiers provide suitable biasing arrangements for the first and second rectifiers whereby the first and second rectifiers are permitted to conduct much more readily in response to small voltages, thereby enhancing the sensitivity of the system.

Figure 2:
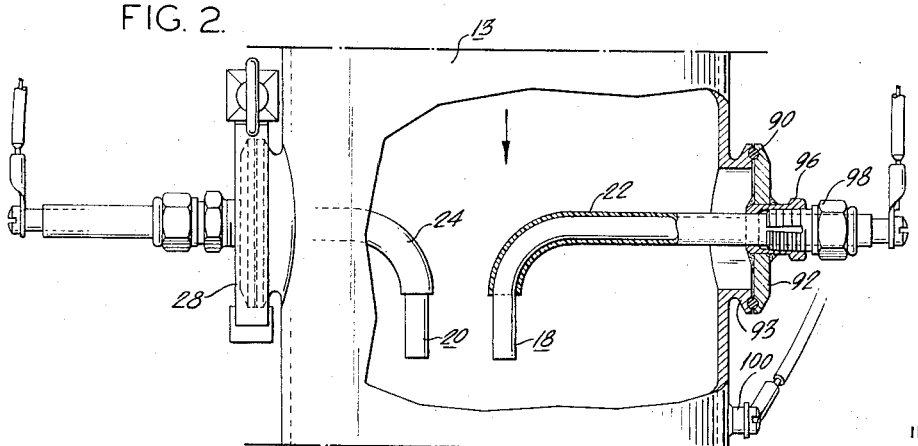

Other objects and features of the invention will become apparent from a consideration of the following detailed description, taken in connection with the accompanying drawings, in which:

FIGURE 1 is a schematic diagram illustrating the invention as applied to controlling a pump for moving a flowable conductive material such as soup through a conduit; and FIGURE 2 is a fragmentary, enlarged sectional view showing a preferred arrangement of the probes used in the embodiment of the invention shown in FIGURE 1.

Referring now to the embodiment of the invention illustrated in the drawings, there is shown a motor 10 for operating pump 12 to move an electrically-conductive product such as soup from an electrically-conductive input conduit 13 through a pipe 14 in the direction indicated by the arrows. The pump may be of any of a variety of known types, and typically includes parts which normally rub together during operation and are subject to excessive wear or damage if not lubricated by the liquid or semi-liquid product on which they act. The conduit may be ordinary steel pipe. A manually-operable valve 15 is positioned upstream of conduit 13 to permit turning on and off of the supply of product to the pump. To avoid damage to the pump 12 it is desirable to provide an arrangement which will sense the absence of the product in conduit 13, or which will at least sense that conduit 13 is not substantially full of the product.

To accomplish this product sensing, a pair of probes 18 and 20 are mounted through different sidewall portions of conduit 13 and insulated from the conduit by means of the insulating sleeves 22 and 24, respectively, shown more clearly in FIGURE 2. The interior ends of the probes are exposed. Appropriate releasable clamping means 26 and 28 may be used to secure the probes in position and to permit their ready removal.

Electrical power for operating the product sensing circuitry is supplied from an alternating current line source 30. Source 30 is connected to the primary winding 32 of power transformer 34. The secondary 36 of transformer 34 has a center tap 37 connected to the conduit 13, which is grounded. The right-most end of secondary winding 36 is connected by way of current-limiting resistor 40 to the conductive probe 18, which may be designated the power probe, the other probe 20 being designated as the pick-up probe.

Pick-up probe 20 is connected to the grounded center tap 37 of transformer 34 by way of the control winding 38 of a magnetic amplifier 40 and a pair of oppositely-poled rectifiers 42 and 44; more particularly, rectifier 42 is poled with its anode element toward magnetic amplifier control winding 38 and rectifier 44 is poled with its anode connected to ground. The junction point 48 between rectifiers 42 and 44 is connected by way of resistor 50 to the left-most end of transformer secondary 36.

In addition, the left-most end of transformer secondary winding 36 is connected by way of resistor 52 and rectifier 54 to pick-up probe 20, rectifier 54 being poled so that its cathode is connected to probe 20. The junction point 60 between resistor 52 and rectifier 54 is connected to ground by way of a rectifier 62 the cathode of which constitutes the element thereof which is grounded. A capacitor 64 is also connected in parallel with the magnetic amplifier control winding 38.

The output of magnetic amplifier 40 operates the coil 70 of an output relay the armature 71 of which controls closing of the normally-open relay contacts 72. The latter relay contacts are connected in a series circuit across the alternating line voltage source 30, the latter series circuit comprising, in addition to normally-open contacts 72, a normally-closed, manually-operable, momentary-contact motor stopping switch 74, a normally-open, manually-operable, momentary contact motor starting switch 76 shunted by normally open relay contacts 78, and a relay coil 80 having an armature 81 which operates contacts 78. The power for operating the motor 10 is supplied thereto from line source 30 by way of the two sets of normally-open contacts 82 and 84, which are also operated to a closed position by current through relay coil 80.

The operation of the system illustrated in FIGURE 1 is as follows. Assume first that conduit 13 is filled with an electrically-conductive liquid product such as soup. Under these conditions, the voltage generated by the right-most half of transformer secondary 36 is applied between the power probe 18 and ground. Current can then flow from power probe 18 to ground by either one of two types of paths; one type of path is from power probe 18 through the soup to the grounded conduit 13, and the other type of path is from power probe 18 to pick-up probe 20 and thence by way of magnetic amplifier control winding 38, rectifier 42 and rectifier 44 to the grounded center tap 37 of transformer 34. The current flowing over the latter path is rectified by the action of rectifier 42 and, even though relatively small, when amplified by magnetic amplifier 40 is capable of operating the relay coil 70. The pulsating half-wave rectified voltage thus applied across the magnetic amplifier control winding 38 is smoothed by capacitor 64.

The arrangement of resistor 50 and rectifier 44 acts somewhat like a biasing battery to bias the cathode of rectifier 42 somewhat negative with respect to its anode. Without this biasing arrangement it is necessary for the voltage produced by pick-up probe 20 to rise sufficiently to exceed the threshold turn-on voltage of rectifier 42. Rectifier 42 is preferably a crystal diode, and since the voltage required to turn on diodes of the crystal type may be appreciable, e.g., at least several tenths of a volt, this would decrease the sensitivity of detection. The voltage drop across diode 44, which is preferably identical to diode 42, is substantially equal to that required to turn on diode 42. Accordingly the use of resistor 50 and diode 44 effectively eliminates this minimum threshold turn-on voltage of rectifier 42 and provides improved sensitivity.

Resistor 52 and rectifier 54 supply pick-up probe 20 with a depolarizing potential which prevents the formation at either of the probes of undesirable products by electrolytic action. Such products might otherwise be formed by the direct current which flows between the probes when bridged by the product in conduit 13. By connecting diode rectifier 54 and resistor 52 between pick-up probe 20 and the left-most end of transformer secondary 36, the pick-up probe is supplied with a positive potential in the intervals between the times when current flows to probe 20 from probe 18 in response to positive potential at the right-most end of transformer secondary 36. Diode 62, while not entirely necessary to operation, is preferably a crystal diode identical with diode 54 and serves to assist in turning on diode 54 when the anode of the latter diode is positive, by maintaining that anode positive with respect to ground by the voltage drop across diode 62 when the left-most end of transformer secondary winding 36 becomes positive.

Still assuming that material such as soup is bridging the gap between probes 18 and 20, the current produced in the control winding 38 of magnetic amplifier 40 operates relay coil 70, which closes contacts 72. Momentary closing of motor starting switch 76 will then permit line current to flow through relay coil 80, which moves armature 81 to close holding contacts 78, so that coil 80 continues to be actuated even after the starting switch has reopened; this also closes relay contacts 82 and 84 to supply operating voltage to motor 10, whereby the pump 12 is operated. The motor will therefore continue to run so long as soup continues to bridge probes 18 and 20, until the motor stopping switch 74 is momentarily opened by the operator, at which time the current through motor relay coil 80 will be interrupted and relay contacts 78, 82 and 84 reopen, thus stopping the motor and pump.

If before the motor stopping switch 74 is operated the soup should cease to bridge the gap between probes 20 and 18, no current will be picked up by probe 20, there will be no current through the control winding 38 of magnetic amplifier 40, relay coil 70 will therefore be deactuated, relay contacts 72 will therefore reopen, relay coil 80 will therefore be deactuated, and relay contacts 78, 82 and 84 will reopen to stop operation of motor 10 and pump 12. Accordingly if the supply of soup to pump 12 should terminate, the probes 18 and 20 will no longer be bridged by the soup, the pump will automatically cease to operate, and the damage to it which might otherwise occur by its continued operation in the absence of the soup is avoided.

FIGURE 2 shows in more detail a preferred arrangement of the power and pick-up probes in the conduit 13, parts corresponding to those in FIGURE 1 being represented by corresponding numerals. Preferably, but not necessarily, the power probe 18 is located coaxially in conduit 13. In a typical example in which the material flowing through the conduit is soup, the conduit may be six inches in diameter, each probe may be a solid steel rod of 5/16" diameter, and the insulating sleeves 22 and 24 may be of nylon. Rectifiers 42, 44, 54, and 62 may be type 1N538 crystal diodes, resistors 50 and 52 may each have a value of 82,000 ohms, capacitor 64 may have a value of three microfarads, and resistor 40 a value of 50 ohms. The line supply voltage may have a value of 115 volts AC, and the alternating voltage at the transformer secondary 36 may be 12 volts on either side of the center tap.

As shown in FIGURE 2, the conduit may be provided with a grooved circular boss for receiving an O-ring gasket 90, to which the probe assembly is secured by any appropriate quick-release fastener. The probe assembly for probe 18 in this example includes the cap 92 which is releasably clamped to boss 93, and which has an internally-threaded nut 96 welded thereto at its center. A tapered, externally-threaded and split plug 98 fits around the insulating sleeve 22 and, upon being screwed into nut 96, tightens upon sleeve 22 and probe 18 to lock them in position. A screw threaded into the external end of probe 18 provides electrical connection thereto. The probe assembly for probe 20 may be the same as for probe 18. A terminal 100 on the exterior of conduit 13 provides the electrical ground connection.

While the invention has been described with particular reference to specific embodiments thereof in the interest of complete definiteness, it will be understood that the invention can be embodied in a variety of forms different from those specifically described without departing from the spirit and scope of the invention as defined by the appended claims.

I claim:

1. Apparatus for sensing the presence or absence of an electrically-conductive material in a predetermined region inside an electrically-conductive conduit, comprising:
   a first conductive probe having an exposed portion in said region in said conduit;
   a second conductive probe having an exposed portion in said region but spaced from said first probe;
   means for insulating said first and second probes from said conduit;
   means for applying an alternating voltage between said first probe and said conduit;
   current-sensing means, a first crystal rectifier and a second crystal rectifier, all connected in series between said second probe and said conduit, said first and second crystal rectifiers being oppositely poled with respect to each other, and means for supplying the interconnection between said first and second crystal rectifiers with an alternating voltage having a phase opposite to that applied between said first probe and said conduit.

2. Apparatus for sensing the presence or absence of an electrically-conductive material in a predetermined region inside an electrically-conductive conduit, comprising:
   a first conductive probe having an exposed portion in said region in said conduit;
   a second conductive probe having an exposed portion in said region but spaced from said first probe;
   means for insulating said first and second probes from said conduit;
   means for applying an alternating voltage between said first probe and said conduit;
   current-sensing means and first current-rectifying means connected between said second probe and said conduit;
   second current-rectifying means having one terminal connected to said second probe; and
   means for supplying the other terminal of said second rectifying means with an alternating voltage of a phase opposite to that supplied to said first probe.

3. Apparatus for sensing the presence or absence of an electrically-conductive material in a predetermined region inside an electrically-conductive conduit, comprising:
   a first conductive probe having an exposed portion in said region in said conduit;
   a second conductive probe having an exposed portion in said region but spaced from said first probe;
   means for insulating said first and second probes from said conduit;
   means for applying an alternating voltage between said first probe and said conduit;
   current-sensing means and current-rectifying means connected between said second probe and said conduit, whereby rectified current flows through said current-sensing means only in the presence of conductive material in said conduit bridging the gap between said first and second probes;
   a first crystal rectifier having one terminal connected to said second probe and having its other terminal supplied with an alternating voltage having a phase opposite to that of said alternating voltage applied between said first probe and said conduit, and a second crystal rectifier connected between said other terminal of said first crystal rectifier and said conduit.

4. Apparatus for moving a flowable conductive material through a conductive conduit, comprising:
   pump means for urging said material through said conduit;
   motor means for operating said pump;
   a first electrically-conductive probe having an exposed portion within said conduit;
   a second electrically-conductive probe having an exposed portion within said conduit and spaced from said first probe;
   means insulating said first and second probes from said conduit;
   a source of alternating voltage comprising a center-tapped transformer winding having its center tap connected to said conduit and one end connected to said first probe;
   current-sensing means, a first crystal rectifier and a second crystal rectifier, all connected in series with each other between said second probe and said conduit, said first and second crystal rectifiers being oppositely poled with respect to each other;
   first resistive means connecting the interconnection of said first and second crystal rectifiers to the other end of said transformer winding;
   second resistive means and a third crystal rectifier connected in series between said second probe and said other end of said transformer winding; and
   a fourth crystal rectifier connected in series with said third crystal rectifier between said second probe and said conduit and oppositely poled with respect to said third crystal rectifier, said third crystal rectifier being so poled as to pass to said second probe voltages of the same polarity with respect to said conduit as the voltage supplied to said first probe for which said first rectifier becomes increasingly conductive.

5. Apparatus for sensing the presence of an electrically-conductive material extending between two regions inside an electrically-conductive container, comprising:
   a first conductive probe having an exposed portion in one of said regions in said container;
   means for applying an alternating voltage between said first probe and said container, thereby to establish a first current path directly from said first probe to said container by way of said electrically-conductive material when said electrically-conductive material extends from said exposed portion to said probe to said container;

a second conductive probe having an exposed portion in the other of said regions and spaced from said exposed portion of said first probe;

circuit means connecting said second probe to said container, thereby to establish a second current path from said first probe to said container, by way of said second probe and said second circuit means, only when said electrically-conductive material bridges said exposed portions of said first and second probes;

said circuit means comprising current-operable means in said second current path but outside said first current path for selectively detecting current flowing from said first probe to said container via said second probe and said circuit means.

6. The apparatus of claim 5, in which said circuit means comprise rectifying means for rectifying current flowing through said second current path and in which said current-operable means comprises means operable by rectified current and in series with said rectifying means.

7. The apparatus of claim 5, in which substantially all current through said second probe is from said first probe.

References Cited

UNITED STATES PATENTS

| | | | |
|---|---|---|---|
| 2,645,749 | 7/1953 | Labino et al. | 318—482 |
| 3,030,890 | 4/1962 | Galik | 137—392 |
| 3,131,335 | 4/1964 | Berglund et al. | 137—392 |
| 3,206,615 | 9/1965 | La Pointe | 73—304 X |
| 3,279,379 | 10/1966 | Klyce | 103—25 |

FOREIGN PATENTS

| | | |
|---|---|---|
| 667,562 | 7/1963 | Canada. |

DONLEY J. STOCKING, *Primary Examiner.*

WILLIAM L. FREEH, *Examiner.*